(12) United States Patent
Stammel et al.

(10) Patent No.: US 11,896,172 B2
(45) Date of Patent: Feb. 13, 2024

(54) JOINT ARRANGEMENT FOR THE PIVOTABLE MOUNTING OF A LID, A SEAT OR A SEAT/LID FITTING ON A CERAMIC SANITARY ARTICLE

(71) Applicant: Duravit Aktiengesellschaft, Hornberg (DE)

(72) Inventors: Thomas Stammel, Hornberg (DE); Rüdiger Demmel, Frasdorf (DE)

(73) Assignee: DURAVIT AKTIENGESELLSCHAFT, Hornberg (DE)

( * ) Notice: Subject to any disclaimer, the term of this patent is extended or adjusted under 35 U.S.C. 154(b) by 337 days.

(21) Appl. No.: 17/098,875

(22) Filed: Nov. 16, 2020

(65) Prior Publication Data
US 2021/0153703 A1 May 27, 2021

(30) Foreign Application Priority Data
Nov. 27, 2019 (DE) ...................... 10 2019 132 130.1

(51) Int. Cl.
*A47K 13/12* (2006.01)
*A47K 13/26* (2006.01)

(52) U.S. Cl.
CPC .............. *A47K 13/12* (2013.01); *A47K 13/26* (2013.01)

(58) Field of Classification Search
CPC ................................ A47K 13/12; A47K 13/26
See application file for complete search history.

(56) References Cited

U.S. PATENT DOCUMENTS

| 2,742,649 | A | * | 4/1956 | Phillips | ................. A47K 13/12 4/240 |
| 6,824,194 | B2 | | 11/2004 | Weissmueller | |
| 2013/0283568 | A1 | * | 10/2013 | Vallance | ................... E05F 3/20 16/277 |
| 2017/0049281 | A1 | * | 2/2017 | Yang | ...................... A47K 13/26 |

FOREIGN PATENT DOCUMENTS

| CN | 202051650 U | 11/2011 |
| DE | 102014105342 A1 | 10/2015 |

(Continued)

OTHER PUBLICATIONS

DE 2022018104601 English machine translation printed Dec. 13, 2022 (Year: 2022).*
Indian Patent Office issued Office Action dated Jul. 26, 2021 regarding the parallel Indian Patent Application No. 202014046290: 6 Pages.

(Continued)

*Primary Examiner* — Christine J Skubinna
(74) *Attorney, Agent, or Firm* — LUCAS & MERCANTI, LLP; Klaus P. Stoffel (57) ABSTRACT

A joint arrangement for the pivotable mounting of a lid, a seat or a seat/lid fitting about a pivot axis on a ceramic sanitary article, which joint arrangement comprises an elongate fastening element which is intended to be arranged on the sanitary article, a bearing element having a passage bore through which the fastening element is intended to engage, and a damper element which damps the pivoting movement and has a connecting element, which likewise has a passage bore into which the fastening element engages or through which said fastening element engages and which fits on the bearing element in the assembled position, wherein the bearing element has a retaining portion which receives the connecting element in a form-fitting manner.

17 Claims, 7 Drawing Sheets

(56) References Cited

FOREIGN PATENT DOCUMENTS

| DE | 102016125047 A1 | 6/2018 |
|---|---|---|
| DE | 202018103450 U1 | 7/2018 |
| DE | 202018104601 U1 | 11/2018 |
| EP | 1199202 A2 | 4/2002 |
| FR | 2666215 A1 | 3/1992 |
| FR | 2703578 A1 | 10/1994 |

OTHER PUBLICATIONS

European Search Report dated Mar. 10, 2021 regarding parallel European Patent Application No. 20199534.7, 2 Pages.
German Patent Office issued Office Action dated Jul. 11, 2022 regarding parallel German Patent Application No. 10 2019 132 130.1, 4 Pages.
Canadian Patent Office issued an Office Action dated Feb. 22, 2022 regarding parallel Canadian Patent Application No. 3,099,007, 7 Pages.
Chinese Patent Office issued an Office Action dated Dec. 28, 2021 regarding parallel Chinese Patent Application No. 202011133838.X, 5 Pages.
Canadian Patent Office issued an Office Action dated Jan. 10, 2023 regarding parallel Canadian Patent Application No. 3 099 007, 6 Pages.
Annex1 attachment to German opposition proceeding, 2 pages.
Annex2 attachment to German opposition proceeding, 1 page.
Annex3 attachment to German opposition proceeding, 1 page.
Annex4 attachment to German opposition proceeding, 1 page.
Annex5 attachment to German opposition proceeding, 1 page.
Annex6 attachment to German opposition proceeding, 6 pages.
Annex7 attachment to German opposition proceeding, 1 page.
Annex8 attachment to German opposition proceeding, 8 pages.

* cited by examiner

JOINT ARRANGEMENT FOR THE PIVOTABLE MOUNTING OF A LID, A SEAT OR A SEAT/LID FITTING ON A CERAMIC SANITARY ARTICLE

CROSS-REFERENCE TO RELATED APPLICATIONS

The present application claims priority of DE 10 2019 132 130.1, filed Nov. 27, 2019, the priority of this application is hereby claimed and this application is incorporated herein by reference.

BACKGROUND OF THE INVENTION

The invention relates to a joint arrangement for the pivotable mounting of a lid, a seat or a seat/lid fitting about a pivot axis on a ceramic sanitary article.

Such a joint arrangement for mounting a seat/lid fitting on a WC is known for example from EP 1 199 020 A2. Such a joint arrangement or a WC seat joint described therein comprises, on the one hand, an elongate fastening element which is intended to be fastened to the sanitary article and is in the form of a mandrel, a damping apparatus and an adapter which serves to connect the damping apparatus to the mandrel. Said adapter has a blind bore by means of which it is fitted onto the mandrel from above, such that it is supported axially on the mandrel by virtue of the blind hole configuration.

The damping apparatus and, in extension thereof, the adapter forms a pivot axis, wherein, because a seat/lid fitting is mounted there, two such joint arrangements or WC seat joints are provided. The one damping apparatus is coupled in a form-fitting manner to the lid, the other to the seat, for which purpose coupling portions of the damping apparatuses engage in a form-fitting manner into corresponding seat- or lid-side receptacles. This makes it possible to damp both the pivoting movement of the lid and of the seat separately by way of the respectively assigned or coupled damping apparatus.

Since, as described, the adapter known from EP 1 199 020 A2 has a blind bore, the mandrel can be introduced only from below or the adapter can be fitted on only from above. The system therefore offers only this one fastening option.

SUMMARY OF THE INVENTION

The invention is therefore based on the problem of specifying a joint arrangement which is improved by contrast.

In order to solve said problem, according to the invention a joint arrangement for the pivotable mounting of a lid, a seat or a seat/lid fitting about a pivot axis on a ceramic sanitary article is provided, which joint arrangement comprises an elongate fastening element which is intended to be arranged on the sanitary article, a bearing element having a passage bore through which the fastening element is intended to engage, and a damper element which damps the pivoting movement and has a connecting element, which likewise has a passage bore into which the fastening element engages or through which said fastening element engages and which fits on the bearing element in the assembled position, wherein the bearing element has a retaining portion which receives the connecting element in a form-fitting manner.

The lid arrangement according to the invention has in principle an elongate fastening element which is intended to be arranged or fixed in a suitable manner on the sanitary article and which constitutes the interface for receiving the damper element. Furthermore, the joint arrangement according to the invention comprises a bearing element with a passage bore. Said bearing element is engaged through by the elongate fastening element, that is to say that it has a passage bore and consequently can be pushed onto the fastening element. In the assembled position, the bearing element is supported with respect to the sanitary ceramics or bears against the top side thereof. Said bearing element serves for receiving and supporting the connecting element which is either an integral part of or is arranged on the damper element. The connecting element is provided in the axial extension of the damper element, the two of which also here form the pivot axis. However, the connecting element has a passage bore, into which or through which the fastening element engages. In the assembled position, the connecting element abuts the bearing element, the two of which being coupled to one another in a form-fitting manner, that is to say that the bearing element has a first form-fit geometry and the connecting element has a second form-fit geometry, the two of which are compatible in terms of shape such that a form-fitting engagement is produced.

The joint arrangement according to the invention has a series of advantages. First, the formation of a passage bore, that is to say a bore which has a constant diameter and passes through the connecting element, offers the option of forming the joint arrangement with different fastening options in relation to the sanitary article, wherein these fastening options differ in the manner in which they are to be released. This makes it possible, as will be addressed further below, to provide a simple release option which enables a simple pulling-off, but also more complex release options in which a tool is required, through to release options which can be released only in a complex manner by releasing fastening means underneath the ceramics. Because of the passage bore, this therefore enables in particular the use of a variety of types of fastening elements, but also the attachment of different fastening means for fixing the connecting element to the fastening element.

Since the bearing element can be rotated about the fastening element which forms as it were an axis of rotation, as it is also possible for the connecting element and thus the damper element to be rotated about the fastening element by virtue of the fastening element engaging into the passage bore of the connecting element, it is furthermore possible, by virtue of the form-fitting engagement, to slightly rotate and align the damper element together with the bearing element, that is to say that the alignment of the bearing element follows that of the damper element. This is possible by virtue of the form-fitting engagement, since a small rotation of the damper element necessarily results in the bearing element being driven along. By virtue of this form-fitting engagement, it is also ensured here that the region cannot be contaminated or can be cleaned well, since as a result of the form fit, no gaps or the like remain to an appreciable extent.

And finally, the elongate fastening element is engaged around and therefore covered by the bearing element at least over part of its length. Since the bearing element is supported on or bears against the ceramics side, and on the top side bears against the bearing element and also the connecting element, the fastening element therefore cannot be contaminated, since it is enclosed as it were in the manner of a housing. The bearing element can be designed such that it is significantly better accessible and thus cleaning is made possible in a simpler manner.

One feature relevant to the invention is the form-fitting coupling of bearing element and connecting element by way of the engagement of the form-fit geometries. Such a form-fitting coupling can be realized in a simple manner in that the connecting element has a round external shape at least in the portion abutting the bearing element and the retaining portion is of a round design in a manner compatible in terms of shape. Round shapes can be produced in a very simple manner, in particular if the components to be coupled are plastics components. The respective form-fit geometry is preferably designed as it were as a part-cylinder shape.

As described, the bearing element itself serves on the one hand as the enclosure or encapsulation of the fastening element, on the other hand however also as a support part for the connecting element and thus the damper device. According to a first alternative of the invention, in this case the bearing element can be designed in the manner of a cap with a wide foot and a adjacent narrower portion which has the retaining portion. In this configuration, the widening foot serves as an additional covering means, in order for example to engage over, that is to say likewise to cover, a bearing washer on which, as further described below, the fastening element can be supported. The corresponding retaining portion, on or in which the connecting element is received, is then provided at the narrowing, other end of the bearing element. As an alternative, it is also conceivable to design the bearing element as a simple sleeve-like component which has the retaining portion at one end. This configuration can then be selected if no importance is attached to covering a possible bearing washer, or if this is not possible for technical reasons, for example in the case of an eccentric mounting, which will be further described below.

In principle, in particular when it has the widening foot, the bearing element also serves as a design element since in particular the foot geometry can be selected as desired. The foot may for example be round, that is to say for example designed to correspond to the shape of an encompassed bearing washer, but it can also be square or polygonal as desired. The possibility also exists of designing it distinctively by way of a corresponding coloring, or for example, like the sanitary article, in white, with the result that it is rather concealed etc.

As various alternatives are given with respect to the configuration of the bearing element, this is also the case with the fastening element. According to a first alternative of the invention, the elongate fastening element may be a mandrel. This mandrel projects in the assembled position substantially vertically from the top side of the sanitary article, with the result that the damper element or connecting element can be pushed on in a simple manner from above by means of the passage bore. This mandrel may, as will be further addressed below, either be fixed directly itself to the sanitary article, for which purpose it engages through the ceramics-side bore by means of a corresponding portion which has a thread and is secured for example from below by a nut, or a tilting counterbearing arranged on the threaded portion abuts the bottom side of the sanitary article and the mandrel is screwed in in relation to said tilting counterbearing etc. As an alternative, the mandrel can also be arranged as it were eccentrically with respect to the actual bore of the sanitary article in which it is arranged on a retaining washer which, for its part, is fixed to the sanitary article by way of a fastening screw. Provided here is therefore an offset arrangement in relation to the ceramics-side bore which, in conjunction with the customary rotary mounting arrangement, brings about an eccentric mounting which makes rotation and thus alignment about two axes possible. This will be further addressed below. That is to say therefore either that the mandrel is provided at least in certain portions with a thread for receiving a counterbearing element, in particular a nut, which fixes said mandrel to the sanitary ceramics, or that the mandrel is arranged on a retaining washer which abuts the sanitary ceramics and is intended to be fixed to the sanitary article by way of a fastening screw arranged offset with respect to the mandrel.

In order to fixedly connect the mandrel to the sanitary article, it is expedient when the mandrel has a collar, by way of which the mandrel having the thread abuts a bearing washer bearing against the sanitary ceramics in the assembled position or the mandrel arranged on the retaining washer abuts the retaining washer. This collar serves to axially support the mandrel either on a separate bearing washer or the retaining washer carrying it in the case of the eccentric mounting. The mandrel can be fixed to the eccentric retaining washer for example by means of a grub screw screwed into an internal threaded bore.

The collar preferably has a retaining geometry for acting on with a tool. The collar is preferably of a square or hexagonal design, such that a fork wrench or open-ended wrench can act thereupon and the mandrel can be screwed in.

As described, in the context of a very simple fastening option, a simple plugging in and therefore also a simple pulling off of the connecting element, but also therefore the seat, lid or the fitting, by the fastening element or the mandrel is provided. In order also to realize a certain axial fixing of the connecting element to the mandrel in the case of this simple fastening arrangement, according to one expedient development at least one clamping ring for clamping the connecting element is provided on the mandrel in the region which engages into the passage bore provided on the connecting element in the assembled position. This clamping ring, for example a metal ring, is braced or clamped against the inner wall of the passage bore in the assembled position, whereby a certain axial arresting is provided which can, however, be released by sufficiently firm pulling in the axial direction.

For a simple assembly when the connecting element is being pushed onto the mandrel, preferably provided on the connecting element on the side which leads during the pushing onto the mandrel in the region of the passage bore is a bevel which makes abutting contact with the clamping ring such that it compresses said clamping ring. During the pushing on, this bevel thus makes abutting contact with the clamping ring, which leads to said clamping ring being slightly compressed and being able to be pushed into the passage bore, where it is radially braced, since it is compressed.

It is also conceivable for at least one damping ring which damps the pushing-on movement to be arranged on the mandrel. This damping ring, a simple rubber ring, serves as it were as a slightly damping stop, when the connecting element comes into the final position in which it is received in a form-fitting manner on the retaining portion of the bearing element.

As stated, the above-described first alternative of the invention is a pure plug-on solution, which enables fixing but also releasing without the use of a tool. A second fastening variant, in which a tool is required for the purpose of assembling but also releasing, provides a threaded bore formed on the mandrel, wherein the connecting element is intended to be fixed by means of a fastening screw which is to be screwed into the threaded bore. Here the connecting element is thus positioned fixedly on the mandrel using a fixing screw, for which purpose a corresponding tool is required. The assembly, but in particular the removal, is more complicated since the use of a tool is indeed required, thereby in particular preventing an undesired, unauthorized release.

In this case, the threaded bore can be designed as an axial bore. This axial bore is introduced in that end face of the mandrel which is exposed in the passage bore, with the result that, after pushing on the connecting element, the fastening screw is then introduced from above into the passage bore and screwed axially into the mandrel. As an alternative, however, also possible is a radial bore which can be accessed from the side by way of a radial bore which is provided on the connecting element and leads into the passage bore. Here, too, the fastening screw can be screwed in then from the side in a simple manner.

It is preferable if, regardless of whether now an axial bore or a radial bore is provided, a depression or recess for receiving a head of the fastening screw is formed on the connecting element, with the result that the fastening screw can be recessed to the greatest possible extent and, if possible, does not protrude laterally.

In the above-described configurations, a mandrel is always used as elongate fastening element, either as a mandrel fastened directly to the sanitary ceramics or as a mandrel which is arranged eccentrically with respect to the actual fastening screw. Both configurations permit release by pulling off the seat, lid or fitting upwardly, either without or with the release of a fastening screw. The joint arrangement according to the invention however also permits a configuration in which a pulling-off of this type is not possible, but an arrangement which is very laborious to release is provided. In this configuration of the invention, the elongate fastening element is a threaded rod with a head which is intended to abut the connecting element. Here, the threaded rod is first plugged from above through the threaded bore of the connecting element and of the bearing element and then plugged through the bore in the sanitary article by means of the bottom end of said threaded rod, after which it is firmly screwed from underneath the sanitary article or the fastening plane by means of a nut or the like. The head of this threaded rod abuts the connecting element which for its part is supported with respect to the sanitary article again by way of the bearing element. A release is only possible if a tool is passed as it were beneath the fastening plane, in order to release the threaded-rod nut, which is very complex and, if the sanitary article is screwed to a wall, for example, sometimes is possible only once the sanitary article has been disassembled from the wall on account of a concealed arrangement of this threaded-rod nut.

That is to say that the system according to the invention enables two different fundamental fastening types, specifically a simple plug-on variant which makes pulling off upward possible, and also a plug-through variant, which is intended to be released only in a very complex manner and which can also be considered to be protection against theft. This results from the formation of a corresponding passage bore on the connecting element, which enables on the one hand the introduction of the mandrel from below and on the other hand the introduction of the threaded rod from above.

In the configuration with threaded rod, a depression or recess for receiving the head is expediently formed on the connecting element, that is to say that the head is positioned in a certain way somewhat recessed with respect to the external contour, in particular with respect to the contour of the portion which is received in a form-fitting manner on the retaining portion., In this case, the head is preferably designed with a round top side, thereby enabling adaptation to the preferably cylindrical base shape of the connecting element and the head runs as it were flush with the cylindrical base shape of the connecting element.

It is furthermore conceivable to provide a covering cap which can be pushed onto the connecting element. This covering cap, which is as it were sleeve-like and has a internal shape which corresponds to the external shape of the connecting element, thus is preferably hollow-cylindrical, is pushed onto the connecting element in a simple manner from the side. The covering hood has a slit so that it laterally engages around the bearing element. This configuration enables a visually appealing encapsulation of the actual connection region, such that neither the passage bore and thus the end face of the mandrel, optionally with screwed-in fastening screw, are exposed or can be seen, nor the head of the threaded rod. The configuration is preferably selected such that the external diameter of the covering cap corresponds to the external diameter of the cylindrical damper element, with the result that a continuous cylindrical body is provided after the covering cap has been pushed on.

The connecting element itself, as well as the bearing element and optionally the bearing washer, the retaining washer and the covering washer, can be made of plastic. The plastic configuration, in particular in relation to the connecting element and thus however also the damping element, insofar as both are designed integrally, as well as the bearing element made of plastic permits simple production of the corresponding components and furthermore offers simple possible shape and color variations. The bearing washer, the retaining washer and the covering cap can also be made of plastic, but like the fastening element they can also be realized from metal. The bearing washer itself, which is preferably made of metal, can also be slightly convex, in order to realize a permanent fastening or axial bracing as a result of the material stress of the washer which is braced in the assembled position.

Along with the joint arrangement itself, the invention also relates to a sanitary apparatus comprising a ceramic sanitary article as well as a seat, a lid or a seat/lid fitting which is mounted on the sanitary article by means of one or two joint arrangements of the type described above. The sanitary article may be a WC which is arranged on the floor or the wall. In this case, a seat/lid fitting is expediently used in conjunction with two joint arrangements according to the invention having damper elements, since both the pivoting movement of the seat and of the lid are intended to be damped in the lowered position. If the sanitary article is a urinal, then only a lid is provided which can be mounted in a damped manner by way of only one joint arrangement according to the invention. Provided on the other lid side may be a simple bearing pin which, together with the damper device and the connecting element, forms or extends the bearing axis and is fixed to the sanitary article by means of a hinged mandrel. It is conceivable however also for the sanitary article to be designed as a bidet, where for example only a seat is arranged which likewise is pivotably mounted in a damped manner only by means of a joint arrangement.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
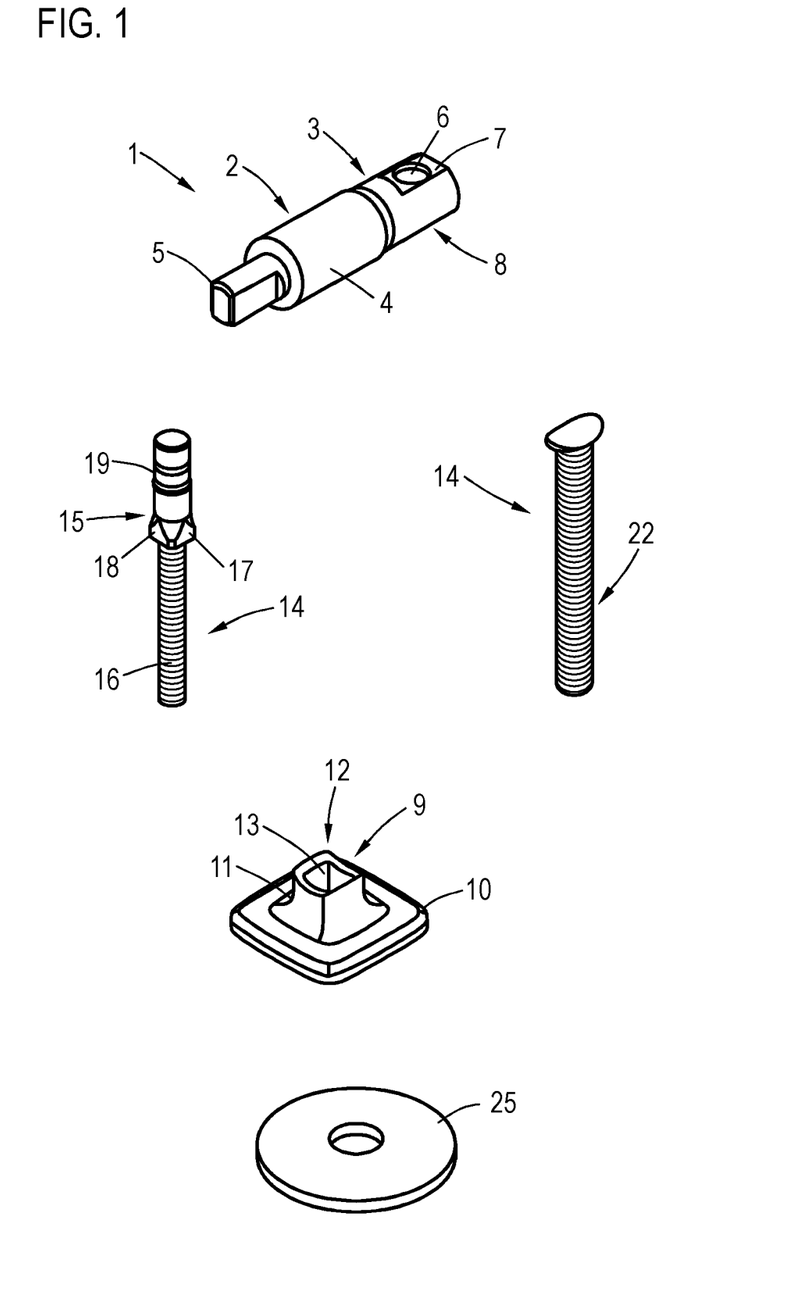
FIG. 1 shows an exploded representation of a joint arrangement according to the invention in two different embodiments.

FIG. 1 shows an exploded representation of a joint arrangement 1 according to the invention, comprising a damper element 2 with dedicated connecting element 3, which here is designed integrally with the damper element 2. The damper element 2 has a housing 4 which is preferably manufactured from plastic and on which the connecting element 3 is integrally formed.

Formed on the damper element 2 in a manner known per se is a form-fit geometry in the form of a flattened, protruding pin 5 which runs into the inside of the housing 4 and there, usually fluidically, is coupled to or interacts with a damping apparatus, with the result that a rotation of the pin 5 in relation to the housing 4 takes place in a damped manner. The pin 5 engages into a corresponding form-fit contour which is compatible in terms of shape on a seat or a lid, which is intended to be fastened on the top side to a ceramic sanitary article by way of the joint arrangement 1, with the result that a pivoting movement of the seat takes place necessarily with respect to a rotation of the pin about the pivot axis, which is formed by the damping element 2 in conjunction with the connecting element 3. The basic structure of such a damper element and the arrangement of such seat, lid or fitting mountings is known, see for example EP 1 199 020 A2.

In the joint arrangement according to the invention, the connecting element 3 has a passage bore 6, that is to say a bore of constant diameter. A flattening or depression 7 is formed on the top side of the connecting portion, that is to say that a planar top side is produced. The bottom side of the connecting element has a form-fit geometry 8 which is provided with a round external shape, preferably a part-cylinder shape.

The joint arrangement 1 comprises in addition a bearing element 9 which has a wide foot 10 adjoining a narrower portion which has, on its top side, a retaining portion 11 in the form of a second form-fit geometry 12, which is likewise of a round design and is compatible in terms of shape with the first form-fit geometry 8 of the bottom side of the connecting element 3. In the assembled position, which will be further addressed below, the connecting element 3 lies by way of its form-fit geometry 8 in a form-fitting manner in the second form-fit geometry 12 of the bearing element 9, with the result that both are coupled in a rotationally secured manner with respect to a rotation about the axis running through the passage bore 6.

The bearing element 9, which in the example shown has a rectangular foot 10 which can have similar or else round or another geometry, likewise has a passage bore 13 which communicates with the passage bore 6 in the assembled position.

The two passage bores 6, 13 serve to jointly receive a fastening element 14, wherein two configurations of fastening elements are shown in FIG. 1. The first alternative of the invention provides a fastening element 14 in the form of a mandrel 15 which has a threaded portion 16, which serves to receive a fastening nut or the like in order to screw the mandrel 15 to the sanitary article. Adjoining the threaded portion 16 is a radially outwardly protruding collar 17, which is flattened laterally and thus has a retaining geometry 18 which can be acted on by a tool such as an open-ended wrench or the like, in order to firmly screw the mandrel 15 to the ceramics.

Adjoining the collar 17 is the actual mandrel portion 19, which engages into the aperture 6 in the assembled position. Received on the mandrel portion 19 in a groove is a clamping ring 20 which brings about a radial bracing with respect to the inner wall of the passage bore 6 in the assembled position. The clamping ring 20 is expediently a metal ring. Arranged axially spaced apart therefrom is a damping ring 21, for example a simple rubber ring, which damps the pushing-on movement when the connecting element 3 or the damping alternative 2 is thus pushed onto the mandrel 15.

FIG. 1 shows in addition, as described, an alternative second fastening element 14 in the form of a threaded rod 22 which enables a further fastening variant, which however will be addressed in more detail below.

Figure 2:
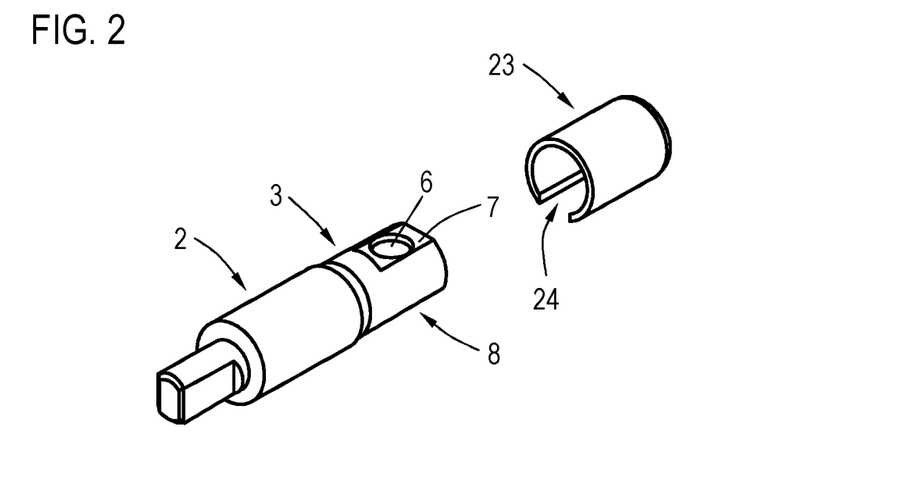
FIG. 2 shows an enlarged perspective view of the damper element with dedicated covering cap.
Figure 3:
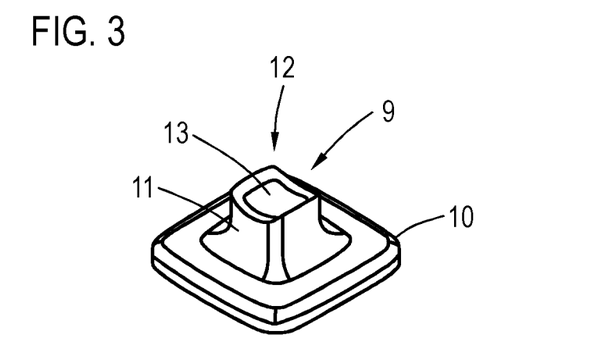
FIG. 3 shows an enlarged perspective view of the bearing element.
Figure 4:
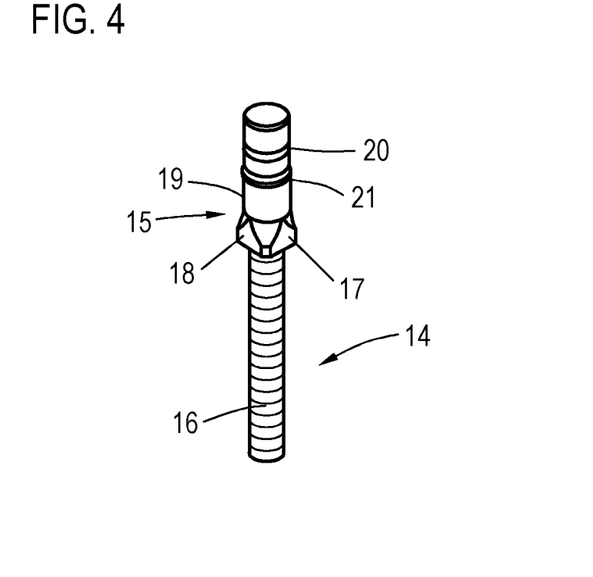
FIG. 4 shows an enlarged perspective view of the fastening element in the form of a mandrel.

More specific details relating to the components of the first variant of the invention, specifically the damping element 2, along with connecting element 3, the bearing element 9 and the fastening element 14 in the form of the mandrel 15 can be seen from FIGS. 2 to 4.

FIG. 2 shows, in an enlarged perspective view, the damper element 2 with the integrally formed connecting element 3. The flattening or depression 7, in the region of which the passage bore 6 is formed, can be clearly seen.

Also shown is a covering cap 23 which is plugged onto the connecting portion 3 in the assembled position. Said cap has a recess 24 in order to engage around the bearing element 9, which is arranged in each case underneath the connecting portion 3 in the assembled position. Like the damper element 2 and the connecting portion 3, the covering cap 23 is also preferably manufactured from plastic.

The damper element 2, along with connecting element 3, and the covering cap 23 are the same for all subsequently described configuration variants.

FIG. 3 shows, in an enlarged view of a detail, the bearing element 9 with the wide, flat foot 10, on which the narrower portion with the end-side retaining portion 11 rises as it were centrally. It can be seen that the retaining portion 11 is realized as round, recessed, second form-fit geometry 12, which receives the round first form-fit geometry 8, that is to say the bottom side of the connecting portion 3, in a form-fitting manner. The bearing element 2 is also preferably a plastics element, but it can also be realized from metal.

FIG. 4 shows, in an enlarged representation, the mandrel 15, which expediently is a metal component, because it on the one hand has to enter into a fixed connection with respect to the sanitary article but on the other hand also has to absorb the corresponding moments in the event of pivoting. The details already described above are clearly illustrated in FIG. 4.

Figure 5:
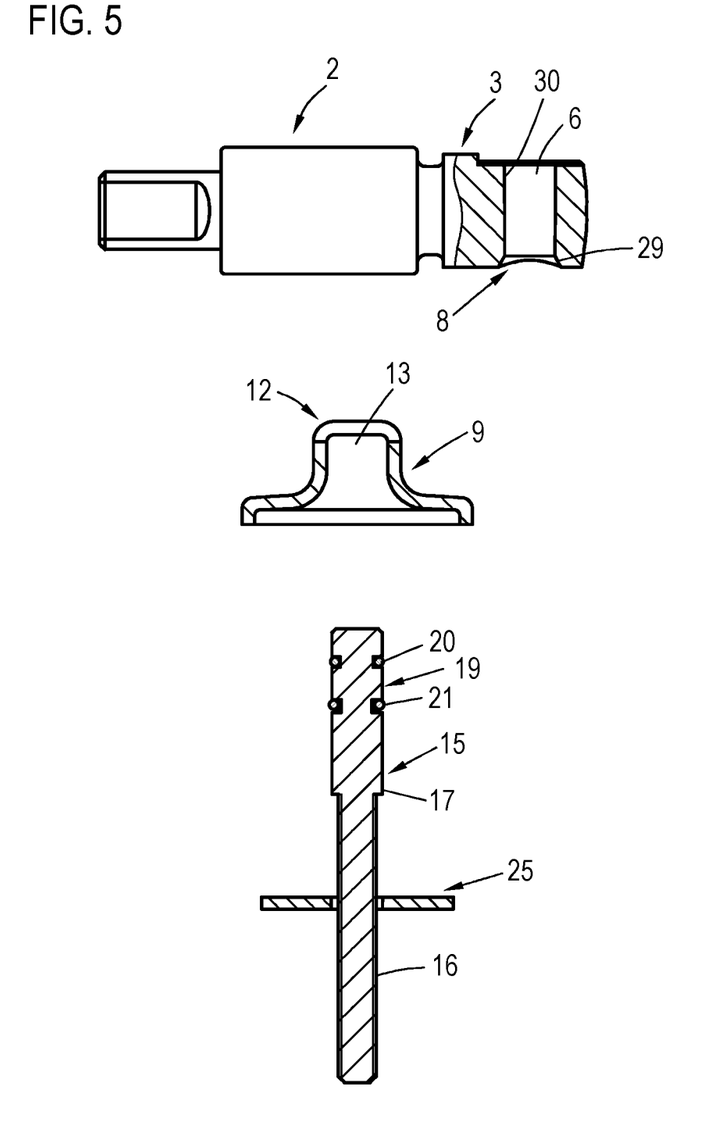
FIG. 5 shows an exploded representation, partially sectioned, of a first configuration according to the invention of the joint arrangement of the first embodiment with mandrel.

FIG. 5 shows, in the form of an exploded representation, partially sectioned, the described elements before the assembly. The damper element 2 with the integrally formed, sectioned connecting element 3, the sectioned bearing element 9 as well as the sectionally illustrated mandrel 15, and a bearing washer 25 assigned thereto are shown, preferably likewise made of metal. For the purpose of assembly, first the bearing washer 25 is pushed onto the threaded portion 16 of the mandrel 15, after which it is pushed through a corresponding bore 26 in the ceramic sanitary article 27, which is only basically illustrated in FIG. 6 that shows the assembled position. In the example shown, a nut 28 is screwed onto the threaded portion 16 from the bottom side, by way of which the mandrel 15 is firmly fixed because it bears against and is counter-mounted by the bearing washer 25 at the opposite side by means of the collar 17. The bearing washer 25 is preferably made of metal and slightly convex such that it is slightly deformed when the screw connection is being tightened, as a result of which an axial securing stress which fixes the screw connection is produced.

After this, the bearing element 9 is pushed on, the foot of which is dimensioned such that it engages over the bearing washer 25. The bearing element 9 serves, as described, to receive the damper element 2 or the connecting element 3, which next is pushed onto the mandrel 15 or the mandrel portion 19, which still protrudes axially out of the passage bore 13 of the bearing element 9, by means of the passage bore 6. As FIG. 5 shows in the sectional view, a bevel 29 is formed on the bottom side of the connecting element 3, that is to say in the region of the first form-fitting contour 8, at the entrance to the passage bore 6. During the pushing onto the mandrel portion 19, this bevel 29 makes abutting contact with the radially somewhat protruding clamping ring 20. This leads to the clamping ring 20 being compressed by virtue of the conical shape of the bevel. During further pushing on, said clamping ring abuts the inner wall 30 of the passage bore 6 with pressure, with the result that a fixing by clamping is possible by way thereof.

When the final position has been reached, the bevel 29 makes abutting contact with the damping ring 21, with the result that a damped contact of the two form-fit geometries 8 and 12 with one another takes place.

Figure 6:
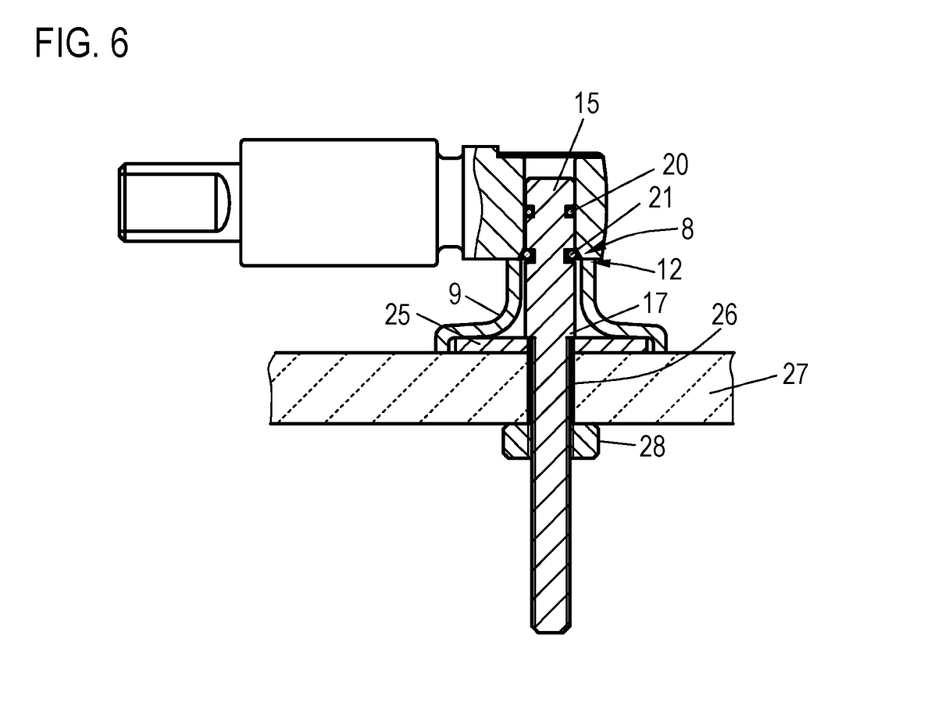
FIG. 6 shows a basic representation of the assembled position, partially sectioned, of the arrangement from FIG. 5.

FIG. 6 shows the assembled position, from which it can be seen that the mandrel 15 is completely encapsulated and the outside of the joint arrangement is formed by the bearing element 9 in the region underneath the damping device 2.

In this position, the damping element 2 can be pivoted about the axis of the mandrel 15, only the clamping action of the clamping ring 20 opposes the pivoting with a small resistance. This makes a simple alignment of the connecting element 2 in relation to the seat and/or lid possible. However, the bearing element 9 also pivots by means of the connecting element 2 about the mandrel axis, as a result of the form-fitting connection of the form-fit geometries 8 and 12.

In the above-described configuration, the fixing of the connecting element 3 on the mandrel 15 takes place by way of a clamping by means of the clamping ring 20. This arrangement can be readily released again, that is to say that the damping device 2 can be pulled off from the mandrel 15 again in a simple manner. Only the resistance of the clamping via the clamping ring 20 has to be overcome.

Figure 7:
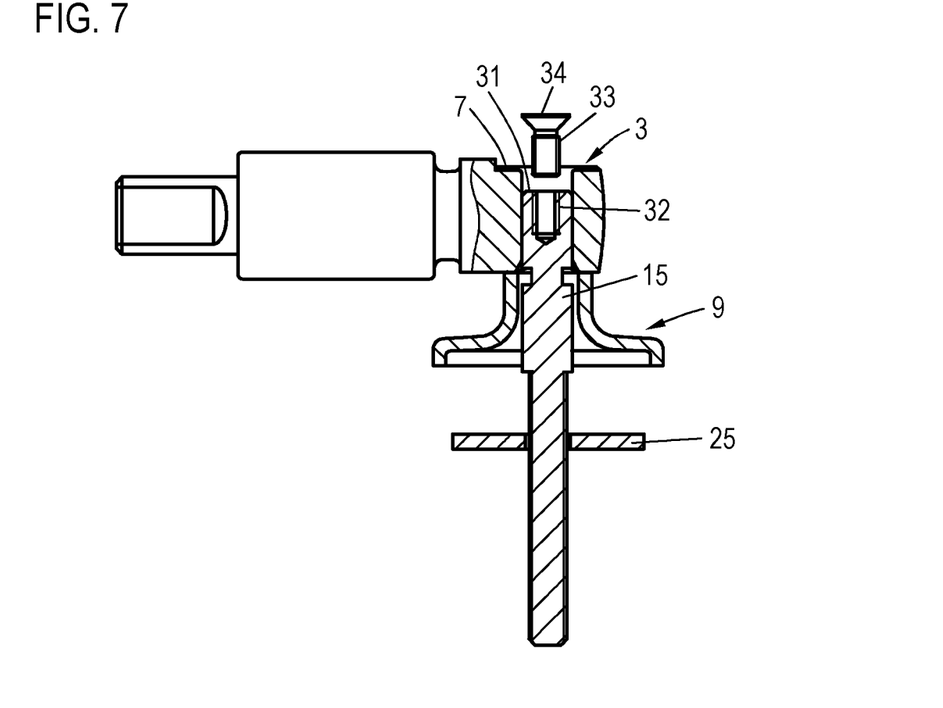
FIG. 7 shows a partially sectioned view of a second configuration according to the invention of the joint arrangement of the first embodiment with mandrel, partially assembled.

In order to realize a more secure fixing, a configuration as shown in FIG. 7 is conceivable. FIG. 7 shows in turn a partially sectioned, partially assembled joint arrangement 1, which is identical to the above-described configuration in this respect, that is to say likewise has, in addition to the damper element 2 along with connecting element 3, a bearing element 9 of the type described previously and a mandrel 15.

What is different than the preceding embodiment is that formed in the end face 31 of the mandrel 15 is an internal threaded bore 32, into which a fastening screw 33 is screwed, the screw head 34 of which bears against the flattening or depression 7 in the assembled position. In this way, the connecting element 3 is tensioned fixedly against the bearing element 9 which abuts the sanitary article. The length of the fastening screw 33 is dimensioned such that, as before, the covering cap 23 can be pushed on.

In this configuration, a release of the connection is thus possible only by means of a tool.

In principle, it would be conceivable also to form a top-side internal threaded bore 32 on the mandrel 15 shown in FIG. 4, as well as to provide the clamping ring 20 or at least one groove and the damper ring 21 or at least one groove on the mandrel 15. This makes it possible, with one and the same mandrel 15, to decide on site whether the fastening variant shown in FIGS. 5 and 6 or the fastening variant shown in FIG. 7 is then realized.

Figure 8:
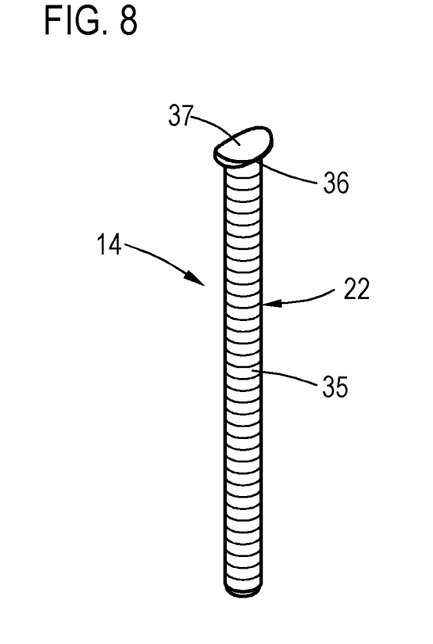
FIG. 8 shows an enlarged basic representation of a fastening element in the form of a threaded rod.

FIG. 8 shows, in the form of an enlarged perspective view, the second embodiment of the connecting element 14 in the form of the threaded rod 22. Said threaded rod has an elongate threaded portion 35 which terminates in a head 36, which has a round top side 37 in the example shown. In this configuration, the assembly sequence is different than the above-described variant.

Figure 9:
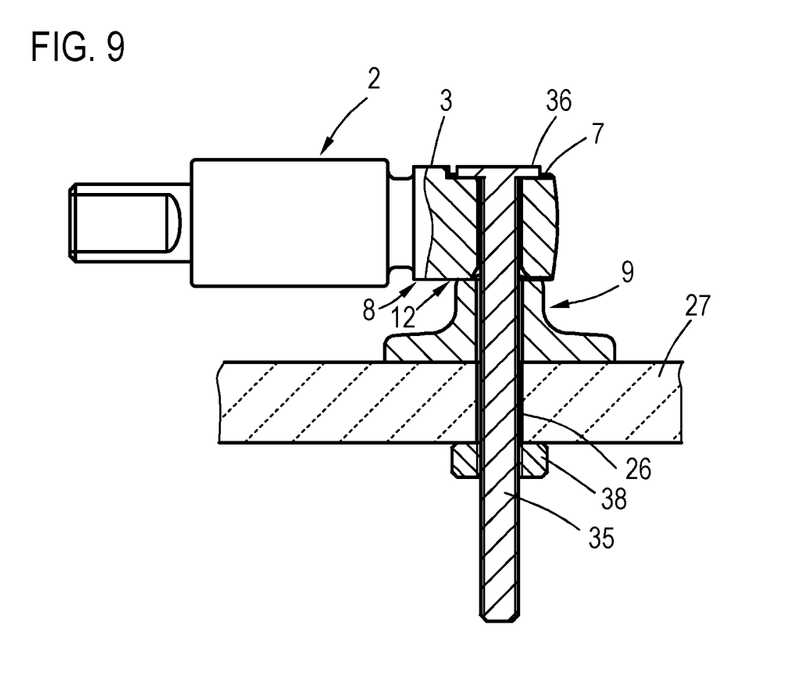
FIG. 9 shows a partially sectioned basic representation of the assembled joint arrangement of the second configuration with the threaded rod.

Here, first of all the connecting element 3, see FIG. 9, is pushed onto the threaded portion 35 until the screw head 36 bears flat against the flattening or depression 7.

Subsequently the bearing element 9, which in the example shown is made from solid material, is pushed on, that is to say is not of a somewhat sleeve-like design as illustrated in the preceding figures. As required, a preferably metallic and optionally slightly convex bearing washer can also be pushed on here, by way of which the bearing element 9 would then be supported on the ceramics in the assembled position. If a bearing washer is not used, the bearing element 9 is supported directly on the ceramics, as shown in FIG. 9. This prefabricated arrangement is then placed onto the sanitary article 27 such that the threaded portion 35 engages through the bore 26. Then, a nut 38 is screwed onto the threaded portion 35 from below the fastening surface on the sanitary article 27, by way of which the arrangement is axially firmly braced. Before this bracing, the joint pivoting option of damper element 2 and bearing element 9 is also provided here, since the first form-fit geometry 8 of the connecting element 3 also engages in a form-fitting manner into the second form-fit geometry 12 of the bearing element 9 here.

Although FIG. 9 here has a bearing element 9 designed as a stable solid-material part, a bearing element as described with regard to the first configuration and shown in section in FIG. 5 could similarly be used. That is to say that then, as concerns the damper element 2 and the connecting element 3 as well as the bearing element 9, identical components can be used, which naturally is to be preferred to the extent that as few as possible different components should be used to form a system as a whole.

Figure 10:
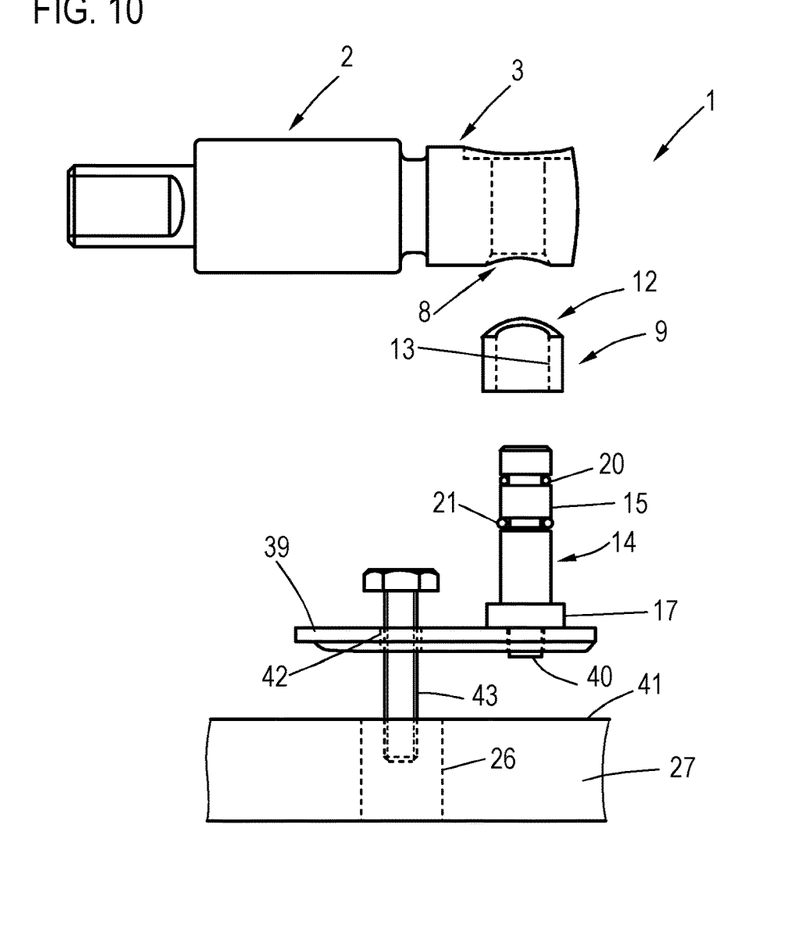
FIG. 10 shows an exploded representation of a joint arrangement according to the invention of a third embodiment according to the invention with mandrel mounted eccentrically on a retaining plate.

FIG. 10 shows an exploded view of a further embodiment of a joint arrangement 1 according to the invention. An identically designed damper element 2 with identically designed connecting element 3 is also used here. Furthermore, a bearing element 9, which here however is of a sleeve-like design, that is to say does not have a foot, is also provided here. Said bearing element likewise, however, has a passage bore 13 and a retaining portion 11 in the form of a second form-fit geometry 12, which interacts in a form-fitting manner with the first form-fit geometry 8 of the connecting element 3 in the same way as described above.

Provided in addition here is also a fastening element 14 in the form of a mandrel 15, the configuration of which substantially corresponds to the mandrel 15 shown in FIG. 4, it is merely not provided with a threaded portion 16, rather the mandrel 15 terminates with the collar 17. Provided on the bottom side of the collar 17 is an internal threaded bore, into which is screwed a fastening screw 40 for the purpose of fastening the mandrel 15 to a retaining washer 39 in the example shown.

In the assembled position, the bearing washer 39 abuts the top side 41 of the sanitary article 27. In order to fix said retaining washer, inserted into a passage bore 42 is a fastening screw 43 which engages through the bore 26 of the sanitary article 27 and is secured on the bottom side by a nut, which is not shown in any more detail.

Figure 11:
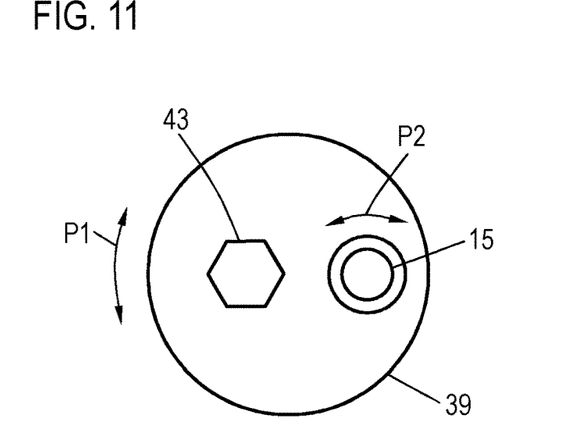
FIG. 11 shows a plan view of the retaining plate along with fastening screw and mandrel.

FIG. 11 shows a view of the retaining washer 39. On the one hand, the fastening screw 43 and, on the other hand, the mandrel 15 is shown. This configuration enables double rotatability and thus alignability of the damper element 2 to a broadened extent. On the one hand, the retaining washer 39 per se can be rotated about the axis of the fastening screw 43, as represented by the arrow P1. The eccentric mandrel 15 can thus be pivoted about this axis.

In addition, as shown by the double-headed arrow P2, as in all the embodiments, the pivotability of the connecting element 2 together with bearing element 9 exists about the axis of the mandrel 15. In this way, the option also exists of also being able to adapt to relatively large tolerances without any problems.

In the context of the assembly, first of all the mandrel 15 is fastened to the retaining plate 39, after which the fastening screw 43 is placed and pushed through the bore 26 and secured slightly by way of a nut. Then, the bearing element 9 is pushed on, followed by the connecting element 3. Said connecting element is here in turn fixed by clamping by way of the clamping ring 20, while the damping ring 21 enables a damped contact of the form-fit geometries 8 and 12 with one another. A simple pulling-off is readily possible here. After aligning the arrangement, the fastening screw 43 is tightened, with the result that the position of the retaining washer 39 is fixed.

Figure 12:
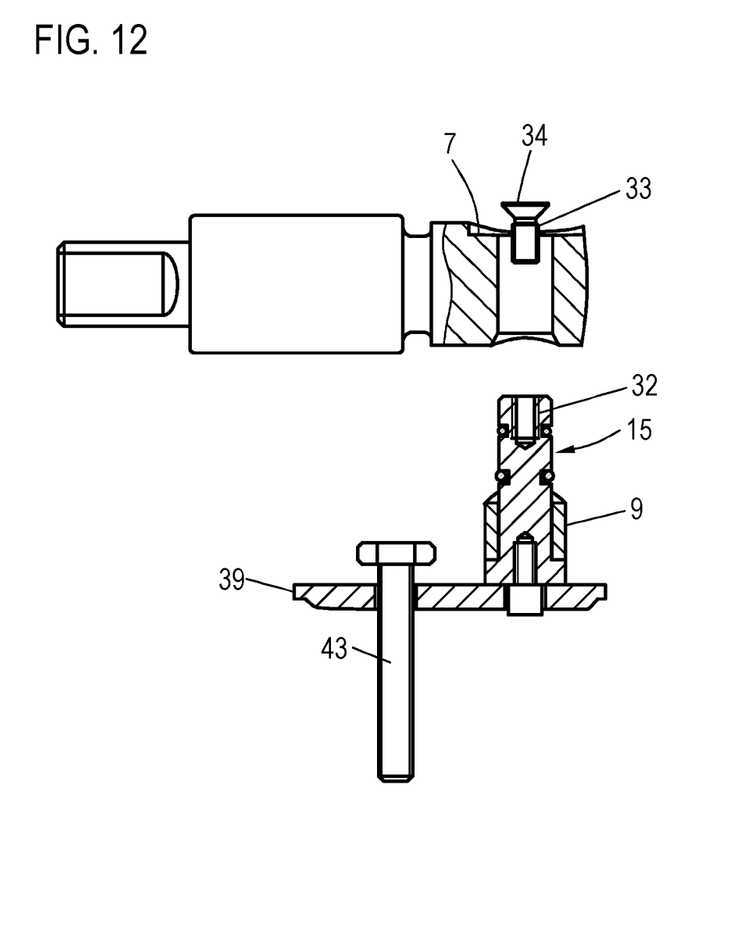
FIG. 12 shows an exploded representation, partially sectioned, of a joint arrangement according to the invention of a fourth embodiment.

By contrast, the configuration according to FIG. 12, which corresponds almost identically to the configuration according to FIG. 10, is different. It is merely the case that the mandrel 15 is designed somewhat differently here because it has an internal thread 32, as in the configuration according to FIG. 7. Into this internal thread 32 in turn is screwed the fastening screw 33, the screw head 34 of which abuts or is received in a recessed manner on the flattening or depression 7. Here, a tool for screwing on the screw 33 is therefore necessary for releasing the connection once again.

It is common to all embodiments that an identically designed damper element 2 along with connecting element 3 that has a passage bore can be used. This passage bore makes it possible to form the different fastening variants, such that overall a variable joint system is produced.

While the configurations in which the fixing of the connecting element 3 to the mandrel 15 takes place by way of the clamping ring 20 are very simple to release, the configurations in which the connecting element 3 is screwed to the mandrel 15 by way of the fastening screw 33 are only intended to be released by a tool. By contrast, the configuration with the threaded rod 22 is even more difficult to release, since the round head 36 thereof cannot be engaged by a tool and for this reason the fastening of the joint arrangement to the sanitary article 27 is possible only by releasing the nut 38 from underneath the ceramics.

While specific embodiments of the invention have been shown and described in detail to illustrate the inventive principles, it will be understood that the invention may be embodied otherwise without departing from such principles.

We claim:

1. A joint arrangement system for the pivotable mounting of a lid, a seat or a seat/lid fitting about a pivot axis on a ceramic sanitary article, which joint arrangement comprises two elongate fastening elements arrangeable on the sanitary article, a bearing element having a passage bore through which the fastening elements engage, and a damper element which damps the pivoting movement and has a connecting element, which also has a passage bore into which the fastening elements engage or through which said fastening elements engage and which fits on the bearing element in the assembled position, wherein the bearing element has a retaining portion which receives the connecting element in a form-fitting manner, wherein one of the elongate fastening elements is a mandrel that has at least one clamping ring in a region of the mandrel that engages in the passage bore of the connecting element in the assembled position, the at least one clamping ring clamping the connecting element, wherein another of the fastening elements is a threaded rod with a head intended to abut the connecting element, the passage bore being configured to receive both the mandrel and the threaded rod.

2. The joint arrangement system according to claim 1, wherein the connecting element has a round external shape at least in a portion abutting the bearing element and the retaining portion has a round shape compatible with the round external shape of the connecting element.

3. The joint arrangement system according to claim 2, wherein the portion abutting the bearing element and the retaining portion have a part-cylinder shape.

4. The joint arrangement system according to claim 1, wherein the bearing element is a cap with a foot and an adjacent narrower portion which has the retaining portion, or the bearing element is a sleeve and has the retaining portion at one end.

5. The joint arrangement system according to claim 1, wherein the mandrel is provided at least in certain portions with a thread for receiving a counterbearing element which fixes said mandrel to the sanitary article, or the mandrel is arranged on a retaining washer which abuts the sanitary article and is fixable to the sanitary article by way of a fastening screw arranged offset to the mandrel.

6. The joint arrangement system according to claim 5, wherein the mandrel has a collar that abuts a bearing washer bearing against the sanitary article in the assembled position or the mandrel arranged on the retaining washer abuts the retaining washer.

7. The joint arrangement system according to claim 6, wherein the collar has a retaining geometry for acting on with a tool.

8. The joint arrangement system according to claim 1, wherein provided on the connecting element on the side which leads during the pushing onto the mandrel in the region of the passage bore is a bevel which makes abutting contact with the clamping ring such that it compresses said clamping ring.

9. The joint arrangement system according to claim 1, wherein at least one damping ring which damps the pushing-on movement is arranged on the mandrel.

10. The joint arrangement system according to claim 1, wherein a threaded bore is provided on the mandrel, wherein the connecting element is intended to be fixed by means of a fastening screw which is to be screwed into the threaded bore.

11. The joint arrangement system according to claim 10, wherein the threaded bore is an axial bore or a radial bore.

12. The joint arrangement system according to claim 10, wherein a depression or recess for receiving a head of the fastening screw is formed on the connecting element.

13. The joint arrangement system according to claim 1, wherein a depression or recess for receiving the head is formed on the connecting element.

14. The joint arrangement system according to claim 13, wherein the head has a round top side.

15. The joint arrangement system according to claim 1, comprising a covering cap which is intended to be pushed onto the connecting element.

16. The joint arrangement system according to claim 1, wherein at least the connecting element and the bearing element are made of plastic.

17. A sanitary apparatus comprising a ceramic sanitary article as well as a seat, a lid or a seat/lid fitting which is mounted on the sanitary article by means of one or two joint arrangement systems according to claim 1.

* * * * *